US012779719B2

(12) United States Patent
Bunnell et al.

(10) Patent No.: US 12,779,719 B2
(45) Date of Patent: Nov. 3, 2026

(54) SAFETY RAZOR AND HANDLE FOR A SAFETY RAZOR

(71) Applicant: Edgewell Personal Care Brands, LLC, Chesterfield, MO (US)

(72) Inventors: Jay Bunnell, Orange, CT (US); Paul Dansreau, Shelton, CT (US); David Evarts, Stratford, CT (US)

(73) Assignee: Edgewell Personal Care Brands, LLC, Chesterfield, MO (US)

(*) Notice: Subject to any disclaimer, the term of this patent is extended or adjusted under 35 U.S.C. 154(b) by 416 days.

(21) Appl. No.: 17/437,181

(22) PCT Filed: Mar. 19, 2020

(86) PCT No.: PCT/US2020/023486
§ 371 (c)(1),
(2) Date: Sep. 8, 2021

(87) PCT Pub. No.: WO2020/205251
PCT Pub. Date: Oct. 8, 2020

(65) Prior Publication Data

US 2022/0168913 A1 Jun. 2, 2022

Related U.S. Application Data

(60) Provisional application No. 62/825,921, filed on Mar. 29, 2019.

(51) Int. Cl.
*B26B 21/52* (2006.01)
*B26B 21/40* (2006.01)

(52) U.S. Cl.
CPC ........ *B26B 21/521* (2013.01); *B26B 21/4068* (2013.01)

(58) Field of Classification Search
CPC . B25B 21/521; B25B 21/4068; B21B 21/521; B21B 21/4068; B21B 21/225;
(Continued)

(56) References Cited

U.S. PATENT DOCUMENTS

| | | | | |
|---|---|---|---|---|
| 949,255 A * | 2/1910 | Bals | B26B 21/18 | 30/76 |
| 1,063,021 A * | 5/1913 | fay | B26B 21/446 | 30/41 |

(Continued)

FOREIGN PATENT DOCUMENTS

| | | |
|---|---|---|
| GB | 674663 A | 6/1952 |
| GB | 1209281 A | 10/1970 |
| WO | 2018202847 A1 | 11/2018 |

OTHER PUBLICATIONS

International Search Report and Written Opinion issued in connection with PCT Application No. PCT/US2020/023486 dated Jun. 22, 2020.

*Primary Examiner* — Boyer D Ashley
*Assistant Examiner* — Fernando A Ayala
(74) *Attorney, Agent, or Firm* — Edgar Rodriguez

(57) ABSTRACT

A safety razor handle has a body having a cartridge attachment end with an adjoined elongated hollow portion terminating in an opening at an opposed end of the body. A pushbutton is slidably retained in the opening and movable along an axis of the hollow portion between an at-rest position and a depressed position. An elongated transfer rod is located in the hollow portion and has a first end in the cartridge attachment end region of the hollow portion and a second end closely abutting the pushbutton. A compression spring acts between the cartridge attachment end and the first end of the transfer rod to bias the transfer rod along the axis towards the opening. An ejector is mounted in the cartridge attachment end having an outer end extendable (Continued)

outwardly from the cartridge attachment end and an inner end closely abutting the first end of the transfer rod.

20 Claims, 7 Drawing Sheets

(58) Field of Classification Search
CPC ............ B21B 21/4062; B21B 21/4075; B21B 21/152; B21B 21/3853; B21B 21/15
USPC .................................................... 30/526, 532
See application file for complete search history.

(56) References Cited

U.S. PATENT DOCUMENTS

| | | | | | |
|---|---|---|---|---|---|
| 1,232,519 | A * | 7/1917 | Fay | B26B 21/18 | 30/74.1 |
| 1,365,212 | A * | 1/1921 | Walker | B26B 21/16 | 30/526 |
| 1,572,572 | A * | 2/1926 | Straka | B26B 21/18 | 30/41 |
| 1,600,832 | A * | 9/1926 | Lindgren | B26B 21/18 | 30/526 |
| 1,773,614 | A * | 8/1930 | Dalkowitz | B26B 21/30 | 30/59 |
| 1,813,699 | A * | 7/1931 | Goetzke | B26B 21/26 | 76/DIG. 8 |
| 1,826,410 | A | 10/1931 | Aronson | | |
| 1,844,318 | A * | 2/1932 | Gaisman | B26B 21/24 | 30/40 |
| 1,848,078 | A * | 3/1932 | Jansson | B26B 21/30 | 30/51 |
| 1,885,814 | A * | 11/1932 | Flagg | B26B 21/18 | 30/41 |
| 1,919,794 | A * | 7/1933 | Marcy | B26B 21/32 | 30/60.5 |
| 2,001,198 | A * | 5/1935 | Klegman | B26B 21/18 | 30/531 |
| 2,024,626 | A * | 12/1935 | Carlson | B26B 21/32 | 30/77 |
| 2,043,124 | A * | 6/1936 | Testi | B26B 21/32 | 30/526 |
| 2,061,720 | A * | 11/1936 | Testi | B26B 21/18 | 30/75 |
| 2,109,554 | A * | 3/1938 | Testi | B26B 21/32 | 30/526 |
| 2,132,293 | A * | 10/1938 | Harrer | B26B 21/52 | 30/526 |
| 2,226,964 | A * | 12/1940 | Benjamin | B26B 21/24 | 30/40 |
| 2,243,348 | A * | 5/1941 | Laxo | B26B 21/16 | 30/526 |
| 2,299,416 | A * | 10/1942 | Testi | B26B 21/24 | 30/70 |
| 2,319,488 | A * | 5/1943 | Burchett | B26B 21/50 | 30/36 |
| 2,363,608 | A * | 11/1944 | Muros | B26B 21/18 | 30/526 |
| 2,386,727 | A * | 10/1945 | Testi | B26B 21/18 | 30/65 |
| 2,392,431 | A * | 1/1946 | Testi | B26B 21/24 | 30/65 |
| 2,397,617 | A * | 4/1946 | Muros | B26B 21/32 | 30/539 |
| 2,413,877 | A * | 1/1947 | Lomax | B26B 21/16 | 30/64 |
| 2,569,167 | A * | 9/1951 | Hellmann | B26B 21/18 | 30/73 |
| 2,644,229 | A * | 7/1953 | Muros | B26B 21/18 | 30/526 |
| 2,654,150 | A * | 10/1953 | Henschien | B26B 21/18 | 30/64 |
| 2,656,599 | A * | 10/1953 | Segal | B26B 21/32 | 30/60.5 |
| 2,698,995 | A * | 1/1955 | Anastasia | B26B 21/32 | 30/34.2 |
| 2,720,695 | A * | 10/1955 | Sabiers | B26B 21/08 | 30/34.05 |
| 2,766,522 | A * | 10/1956 | Linzmeyer | B26B 21/32 | 30/526 |
| 2,775,031 | A * | 12/1956 | Guardino | B26B 21/32 | 30/60.5 |
| 2,835,030 | A * | 5/1958 | Seller | B26B 21/32 | 30/526 |
| 3,027,637 | A * | 4/1962 | Seiler | B26B 21/32 | 30/526 |
| 3,377,701 | A * | 4/1968 | More | B26B 21/32 | 30/60.5 |
| 3,608,193 | A * | 9/1971 | Fay | B26B 21/32 | 30/58 |
| 3,685,150 | A * | 8/1972 | Risher | B26B 21/18 | 30/527 |
| 4,253,237 | A * | 3/1981 | Jacobson | B26B 21/521 | 30/530 |
| 4,258,471 | A * | 3/1981 | Jacobson | B26B 21/521 | 30/532 |
| 4,266,340 | A * | 5/1981 | Bowman | B26B 21/225 | 30/47 |
| 4,314,404 | A * | 2/1982 | Ruiz | B26B 21/446 | 30/41 |
| 4,413,411 | A | 11/1983 | Trotta | | |
| 4,797,998 | A * | 1/1989 | Motta | B26B 21/225 | 30/530 |
| 5,016,352 | A * | 5/1991 | Metcalf | B26B 21/528 | 30/47 |
| 5,182,858 | A | 2/1993 | Chen | | |
| 5,787,586 | A | 8/1998 | Apprille, Jr. et al. | | |
| 6,385,850 | B1 * | 5/2002 | Coulthard, Jr. | B26B 21/4062 | 30/41.5 |
| 6,434,839 | B1 * | 8/2002 | Lee | B26B 21/225 | 30/527 |
| 7,168,173 | B2 | 1/2007 | Worrick, III | | |
| 8,726,520 | B1 * | 5/2014 | Abraham | B26B 21/22 | 30/32 |
| 11,325,273 | B1 * | 5/2022 | Insana | B26B 21/4062 | |
| 2003/0079348 | A1 * | 5/2003 | Follo | B26B 21/521 | 30/527 |
| 2004/0181953 | A1 * | 9/2004 | Follo | B26B 21/521 | 30/527 |
| 2006/0272154 | A1 * | 12/2006 | Brevard | B26B 21/446 | 30/41 |
| 2007/0180699 | A1 * | 8/2007 | Psimadas | B26B 21/40 | 30/34.1 |
| 2008/0216329 | A1 * | 9/2008 | Leventhal | B26B 21/222 | 30/526 |
| 2009/0199406 | A1 * | 8/2009 | Gratsias | B26B 21/38 | 30/526 |
| 2011/0030228 | A1 * | 2/2011 | Rees | B26B 21/521 | 30/536 |
| 2015/0375408 | A1 * | 12/2015 | Shorey | B26B 21/44 | 30/41 |
| 2017/0334083 | A1 * | 11/2017 | Gratsias | B26B 21/225 | |
| 2020/0070376 | A1 | 3/2020 | Petratou et al. | | |
| 2021/0008743 | A1 * | 1/2021 | Lee | B26B 21/521 | |

* cited by examiner

SAFETY RAZOR AND HANDLE FOR A SAFETY RAZOR

BACKGROUND

1. Technical Field

The present disclosure relates to system safety razors in general and, more particularly, to release mechanisms to eject a cartridge from a handle of the system.

2. Background

Many modern so-called "system" safety razors include a disposable razor cartridge adapted to be selectively connected to a reusable handle by connecting structure therebetween. When the cartridge is perceived by a user to have reached the end of its useful life it can be ejected from the handle by operation of an actuator or (release) button connected to a suitable release mechanism.

U.S. Pat. No. 5,787,586 discloses a release button for a system safety razor mounted to a side of a razor handle, and close to the cartridge-bearing end of the handle. International patent application WO2018/202847 discloses another side mounted button but mounted remotely from the cartridge-bearing end of the system handle. U.S. Pat. No. 7,168,173 discloses another release mechanism again having a release button mounted close to the cartridge-bearing end of the system handle.

U.S. Pat. Nos. 1,848,078 and 3,608,193, and G.B. patent number 1,209,281 disclose various embodiments of so-called naked blade razors wherein e.g. a naked double edge blade and not a contemporary razor cartridge is clamped between a cap and a guard of the razor handle. Each of these documents disclose a push button at the end of the handle opposed the blade. Each push button is connected to a relatively long and thin rod, in turn adapted to release the latched cap of the handle to enable a user to selectively change the blade.

A user-perceived indication of quality and performance of a system safety razor lies in the mass of the razor, and position of its center of mass (i.e. how the razor balances in the user's hand). A heavier system razor has more appeal than a lighter razor. Conversely, a heavier razor is less desirable to manufacture due to increased material and shipping costs etc. compared to a lighter razor. Returning to the '586 patent, this discloses a weight component within its handle structure (e.g. 36 in FIG. 3 therein), but this weight provides no benefits to any release mechanism.

SUMMARY

The present disclosure has for its objective to eliminate, or at least substantially alleviate the limitations of the prior art razor handles by providing a handle for a safety razor. The handle has a body with a cartridge attachment end with an adjoined elongated portion having a hollow portion defining an axis and terminating in an opening normal to the axis at an end of the body opposed the cartridge attachment end. The handle also has a pushbutton slidably retained in the opening e.g. by a snap fit, and movable along the axis between an at-rest position and a depressed position. The handle has an elongated transfer rod located in the hollow portion having a first end in the cartridge attachment end reunion of the hollow portion and a second end closely abutting the pushbutton. A compression spring is located in the hollow portion and acts between the cartridge attachment end and the first end of the transfer rod to bias the transfer rod in a direction along the axis towards the opening. An ejector is mounted in the cartridge attachment end having an outer end that can be bifurcated and an inner end closely abutting the first end of the transfer rod. The outer end of the ejector is extendable outwardly from the cartridge attachment end of the handle. The extending direction of the ejector can define an obtuse angle less than 180 degrees to the axis of the hollow portion When the pushbutton is moved by a user from its at-rest position to its depressed position it contacts the second end of the transfer rod to move the transfer rod along the hollow portion axis in a direction towards the cartridge attachment end of the handle against bias forces of the spring such that the first end of the transfer rod contacts the inner end of the ejector to extend the outer end of the ejector outwardly from the cartridge attachment end of the handle.

A safety razor comprises the previously-described handle having a razor cartridge mounted to the cartridge attachment end of the handle. When the pushbutton is operated as previously described, the ejector extends outwardly from the cartridge attachment end of the handle and contacts the razor cartridge to eject the razor cartridge from the handle. When the user releases the pushbutton, bias forces of the compression spring act on the transfer rod to return the pushbutton to its at-rest position.

In other aspects of the present disclosure the transfer rod is tubular and preferably cylindrical and can be manufactured from a relatively high specific gravity material such as steel, stainless steel, brass, copper alloy, zinc alloy, or "heavy" filled thermoplastic polymer. The transfer rod can be manufactured from an intermediate specific gravity material such as aluminum alloy or filled thermoplastic polymer or can be manufactured from a relatively low specific gravity material such as an unfilled thermoplastic polymer.

In further aspects of any preceding aspect the pushbutton can be securely coupled to the second end of the transfer rod. However, preferably the pushbutton closely abuts the second end of the transfer rod such that motion of the pushbutton can move the transfer rod but the transfer rod is independently moveable away from the pushbutton against bias forces of the compression spring to partially absorb impact forces, e.g. if the handle is accidentally dropped.

A transfer rod provides multiple benefits. It can add mass to the razor handle. It transfers motion from the pushbutton to the cartridge ejector without buckling and can provide impact energy absorption. An actuator of (release) button mounted at a cartridge-bearing end of a handle can be accidentally operated by a user during a shaving operation. A pushbutton mounted to an opposed end of a handle can avoid such accidental operation. The above features and advantages will be more fully understood with reference to the following detailed description when taken in conjunction with the accompanying drawings.

DETAILED DESCRIPTION

Figure 1:
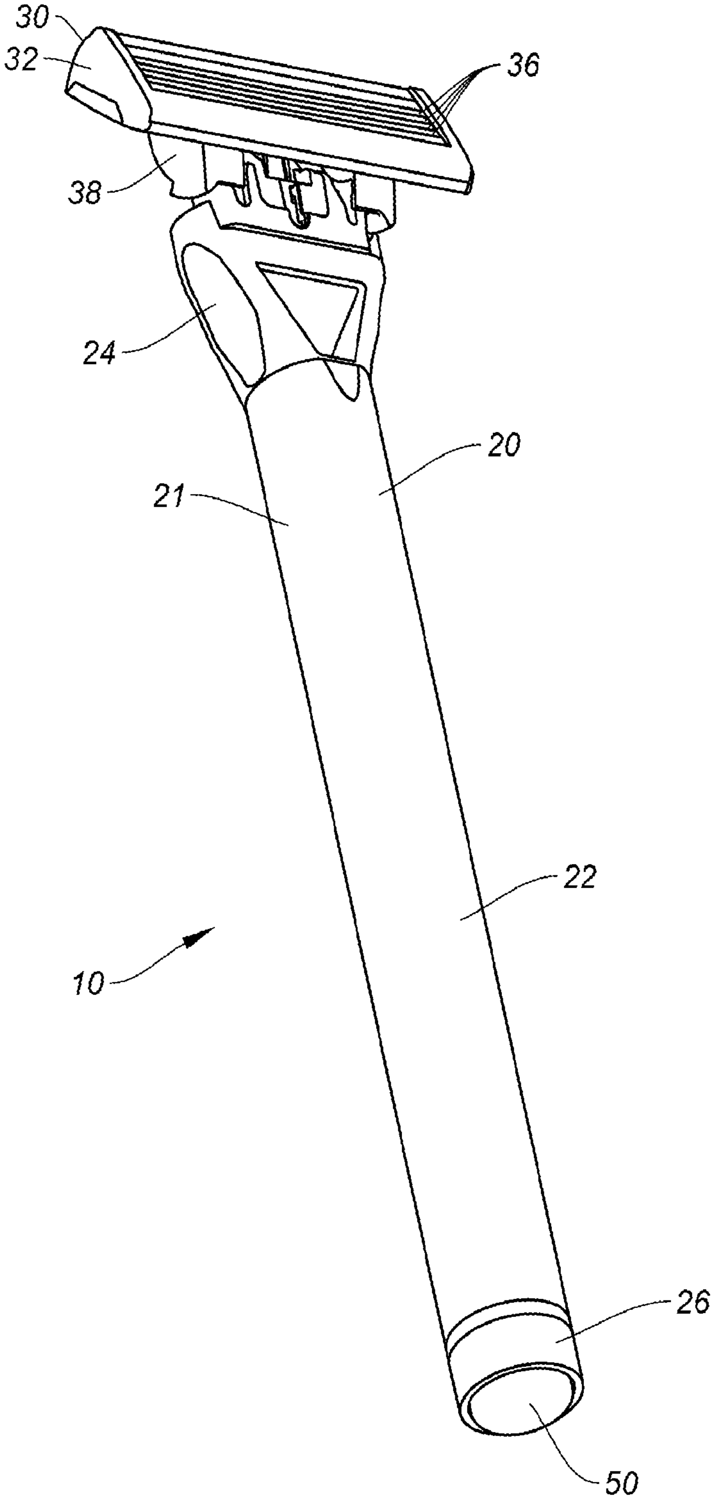
FIG. 1 is a front isometric view of a safety razor of the present disclosure.
Figure 2:
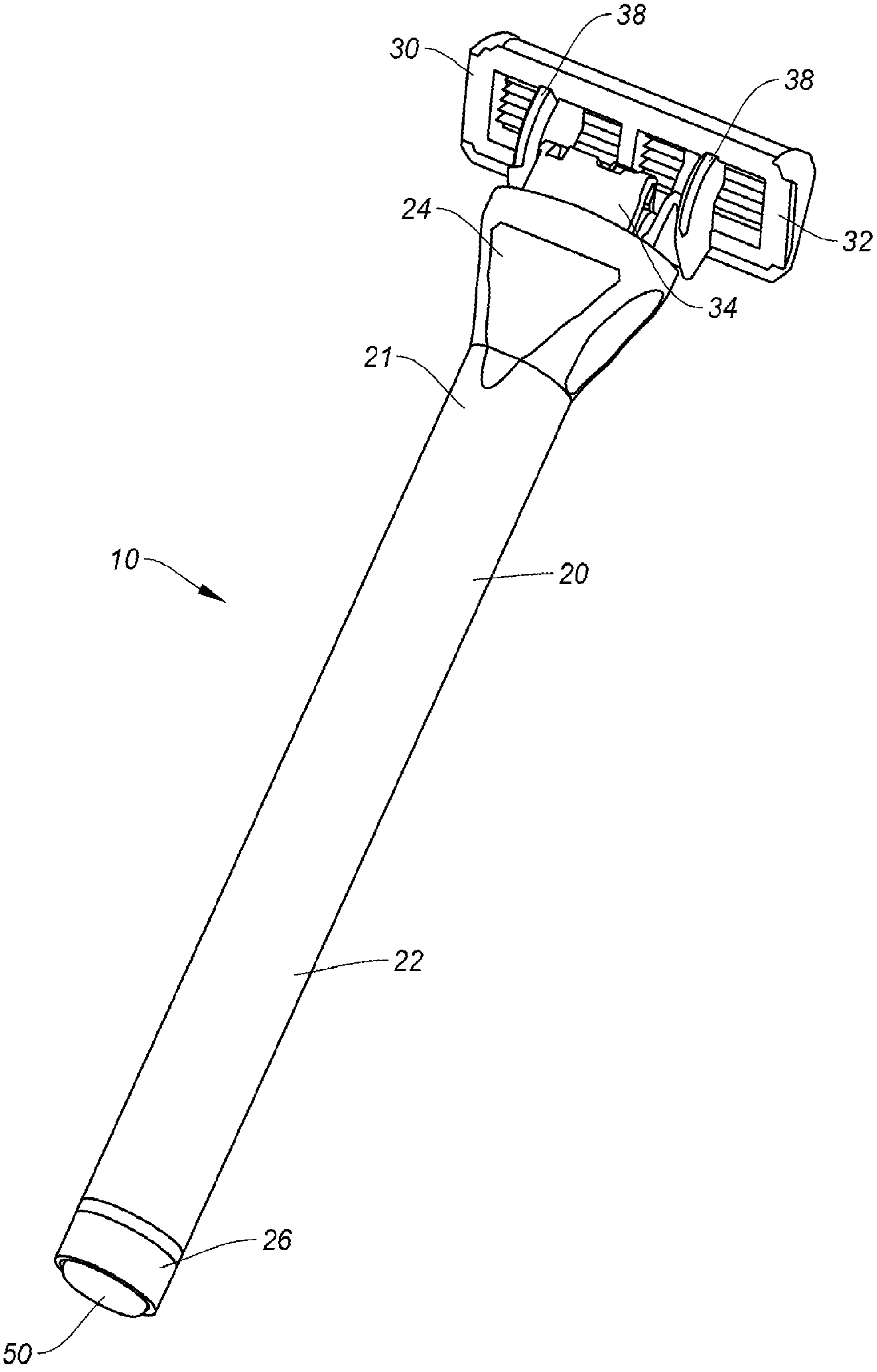
FIG. 2 is a rear isometric view of the safety razor.
Figure 3:
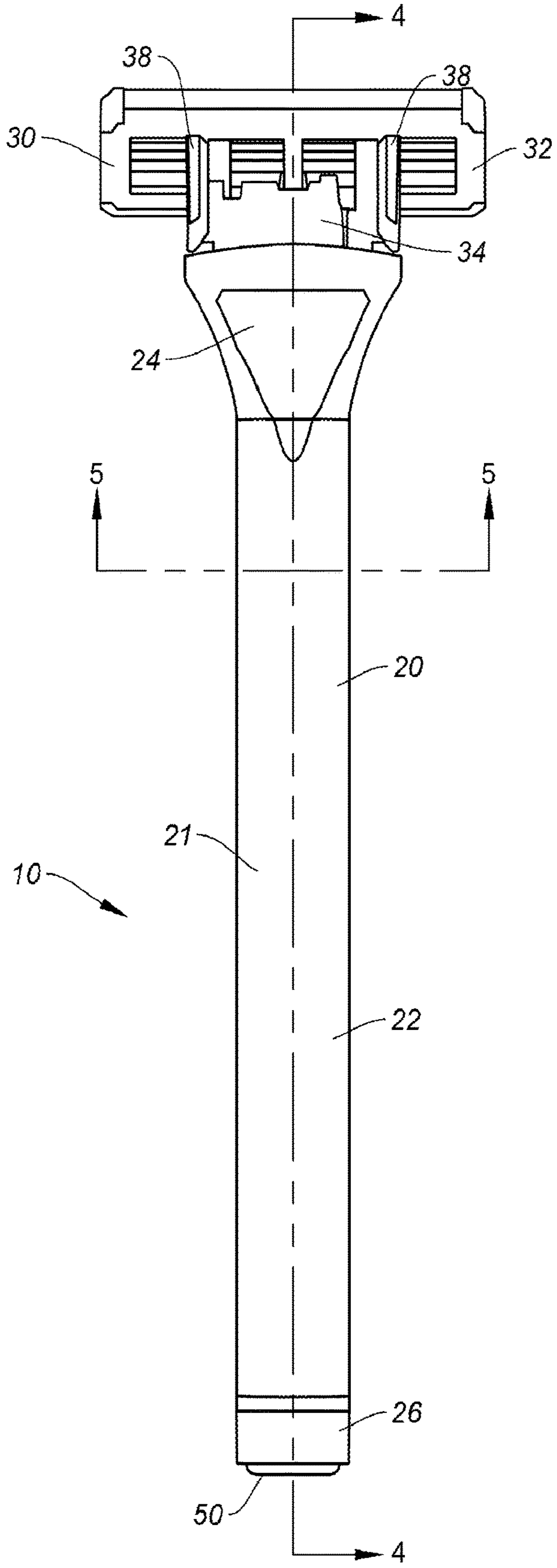
FIG. 3 is a rear orthogonal view of the safety razor.

Referring now to the drawings and in particular FIGS. 1 to 3, isometric and rear views of a safety razor 10 are shown. The safety razor 10 comprises a handle 20, having a body 21 including a cartridge attachment end 24 with an adjoined elongated portion 22, and having an opposed end 26. The safety razor 10 has a razor cartridge 30 mounted to the handle 20. The razor cartridge 30 comprises a molded (e.g. injection molded thermoplastic polymer material) housing 32 supporting one or more razor blades 36. The housing 32 is supported pivotally supported by shell bearing structures 38) to a connector 34 that is in turn mounted to the cartridge attachment end 24 of the handle 20.

Figure 4:
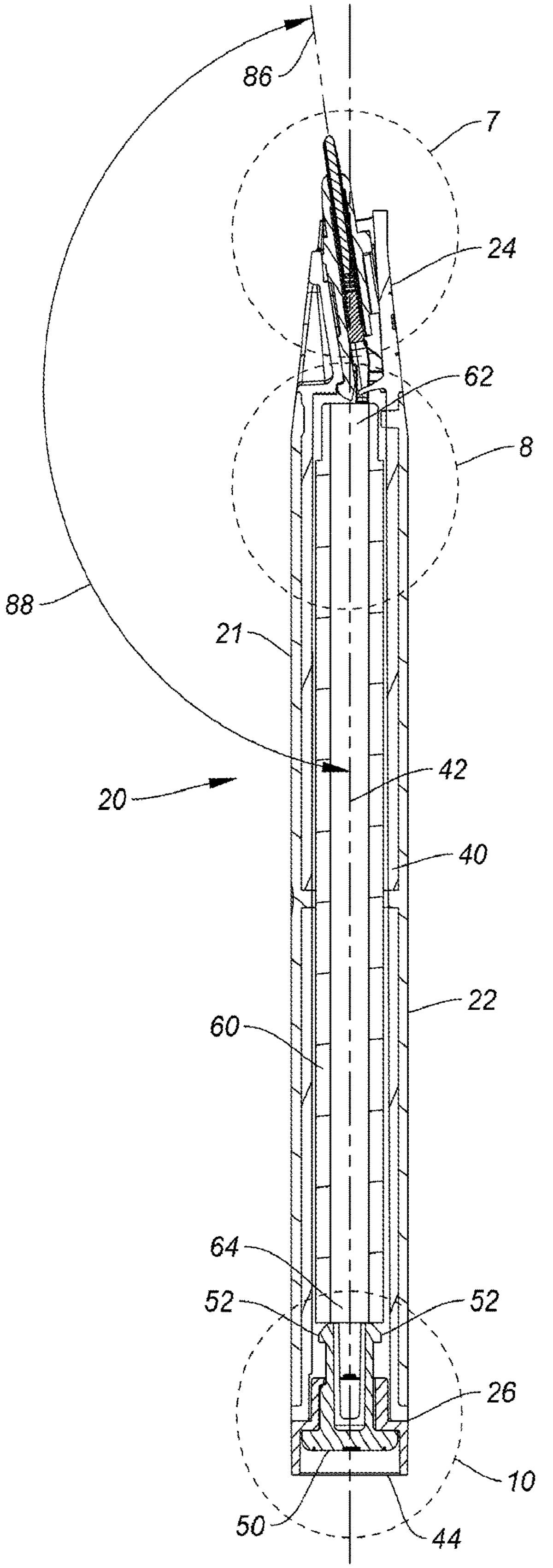
FIG. 4 is a longitudinal sectional view of a handle of the present disclosure, taken at 4-4 in FIG. 3, shown with a pushbutton in a depressed position.

Referring now to FIG. 4, a longitudinal sectional view of the handle 20 alone is shown, taken at lines 4-4 of FIG. 3 and shown with a pushbutton (described later in the present disclosure) in a depressed position. The elongated portion 22 of the body 21 of the handle 20 has a hollow portion 40 defining an axis 42 and extends from the region of the cartridge attachment end 24 to an opening 44 normal to the axis 42, at the opposed end 26 of the handle 20. For benefits such as grippability by a user in a typically used wet environment, the handle 20, and especially the elongated portion 22 can be manufactured in a so-called multi-shot injection molding process and can comprise an external elastomeric thermoplastic polymer layer 48 over a rigid thermoplastic polymer portion 46 (see also FIG. 8).

Figure 10:
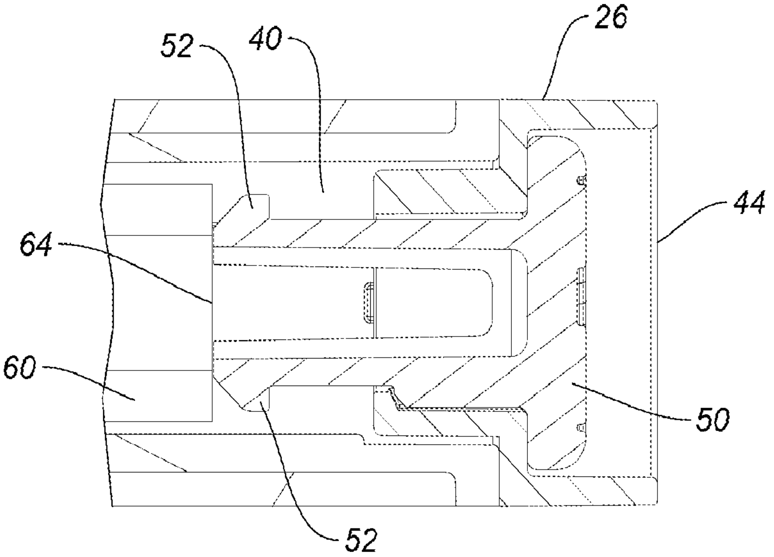
FIG. 10 is a detailed view of a further portion of FIG. 4.

A pushbutton 50 is slidably retained in the opening 44 and movable along the axis 42 between an at-rest position (as shown in FIG. 3) and a depressed position (as shown in FIGS. 4 and 10). In the context of the present disclosure, the term "slidably" is intended to mean the pushbutton 50 can move (slide) in either direction between the at-rest position and the depressed position but is retained to not separate (fall out) from the handle 20 The pushbutton 50 can be retained in the opening to the opposed end 26 of the elongated portion 22 of the handle 20 by e.g. snap fit projection(s) 52. In the at-rest position of FIG. 3 the pushbutton 50 slightly protrudes from the opposed end 26 of the handle while in the depressed position of FIGS. 4 and 10 the pushbutton 50 is within the opposed end 26, sub-flush of the opening 44. These positions are intended to inhibit accidental operation of the pushbutton 50 as the pushbutton 50 is not substantially exposed in its at-rest position but is required to be moved to a substantial sub-flush position for complete user operation to eject a cartridge 30 from the handle 20.

Figure 5:
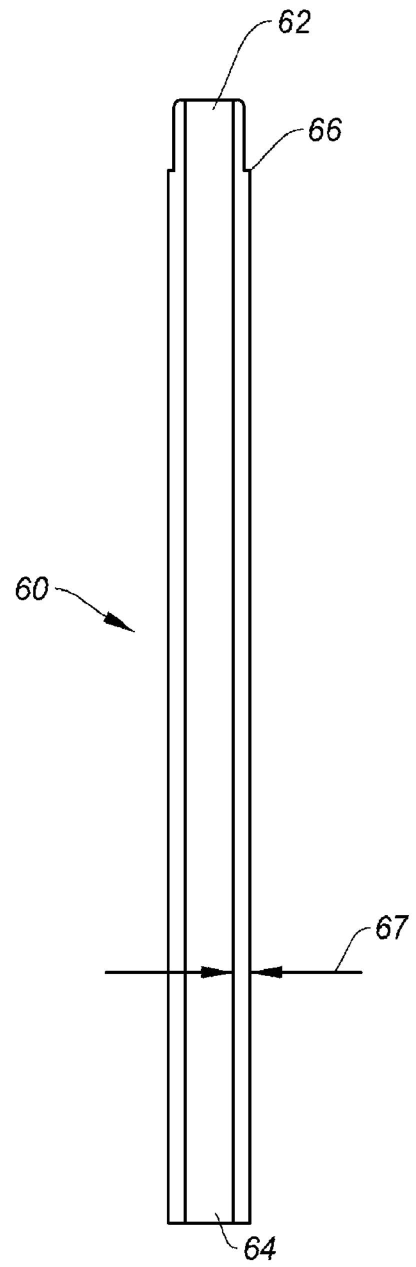
FIG. 5 is a longitudinal sectional view of a transfer rod.
Figure 6:
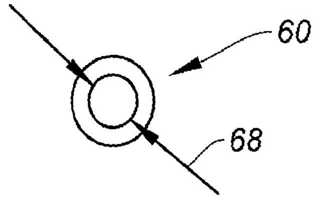
FIG. 6 is an end view of a transfer rod.

Referring additionally to FIGS. 5 and 6, longitudinal sectional and end views of an elongated transfer rod 60 are shown. The transfer rod 60 rod is located in the hollow portion 40 and has a first end 62 in the cartridge attachment end region of the hollow portion and a second end 64 closely abutting the pushbutton 50 (see also FIG. 10). The transfer rod 60 is preferably hollow (i.e. a transfer tube) and more preferably cylindrical (see FIG. 6). An external step 66 is provided at or close to the first end 62 of the transfer rod 60.

The material and dimensions of the transfer rod 60 can be adjusted to suit the application at hand. The transfer rod 60 can be a solid bar. The transfer rod 60 can also be a tubular body having in some instances a relatively thick wall 67 (i.e. a relatively smaller internal diameter 68, see FIGS. 5 and 6) and/or can be manufactured from a material having a relatively higher specific gravity, such as (suitably coated or stainless) steel, brass or other copper alloys, zinc alloy or filled thermoplastic polymer (so-called "heavy" plastic). This transfer rod 60 has a greater mass thus contributing to a desirable greater mass of the handle 20. To maximize mass, the transfer rod 60 can substantially fill the hollow portion 40, e.g. the outside diameter can be 7.0 mm, fitting within a hollow portion having a minimum internal diameter 7.65 mm. An aluminium transfer rod 60, also having a lesser wall thickness 67 can have an intermediate mass. To minimize the mass and thus some manufacturing costs the transfer rod can be manufactured (e.g. molded or extruded) from a suitable thermoplastic polymer such as ABS or polyamide (Nylon). In this instance the benefit of the tubular structure of the transfer rod 60 can be readily seen as this is greatly more resistant to buckling in compression (by actuating the pushbutton 50) than the long and thin rods of the prior art (e.g. U.S. Pat. Nos. 1,848,078 and 3,608,193, and G.B. patent number 1,209,281 mentioned in paragraph [0006]).

Figure 8:
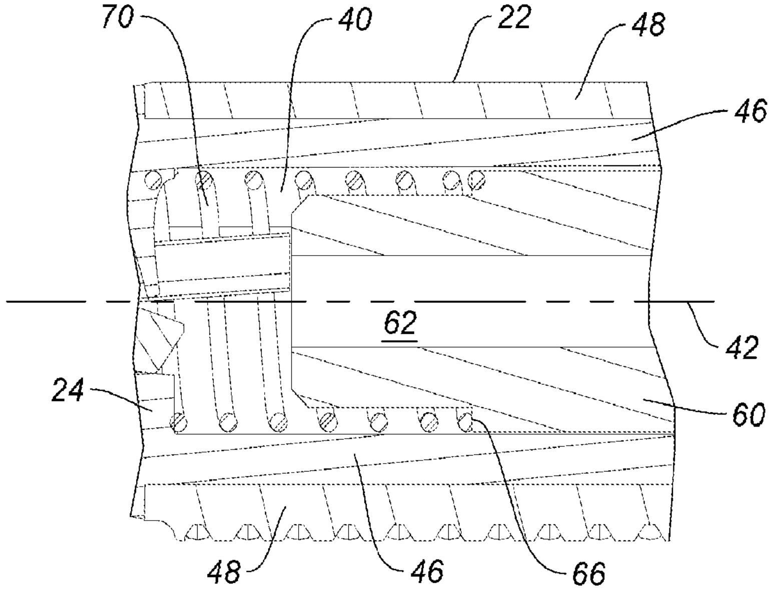
FIG. 8 is a detailed view of another portion of FIG. 4.

A compression spring 70 is shown in detailed view FIG. 8 but omitted from FIG. 4 for reasons of drawing clarity only. The compression spring 70 is located in the hollow portion 40 at its region of the cartridge attachment end 24 of the handle 20 and is mounted over the first end 62 of the transfer tube 60, in contact with the step 66. The spring 70 is compressed to a first condition and acts between the step 66 of the first end 62 of the transfer tube and the cartridge attachment end 24 of the handle 20 (i.e. an end of the hollow portion 40) to bias the transfer rod 60 in a direction along the axis 42 towards the opening 44.

Figure 7:
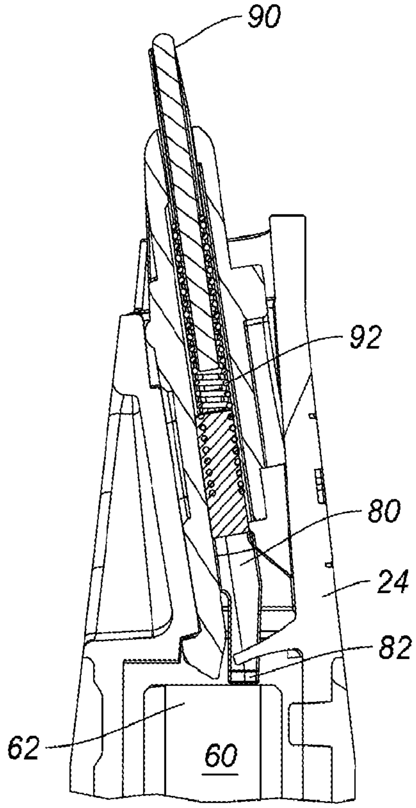
FIG. 7 is a detailed view of a portion of FIG. 4
Figure 9:
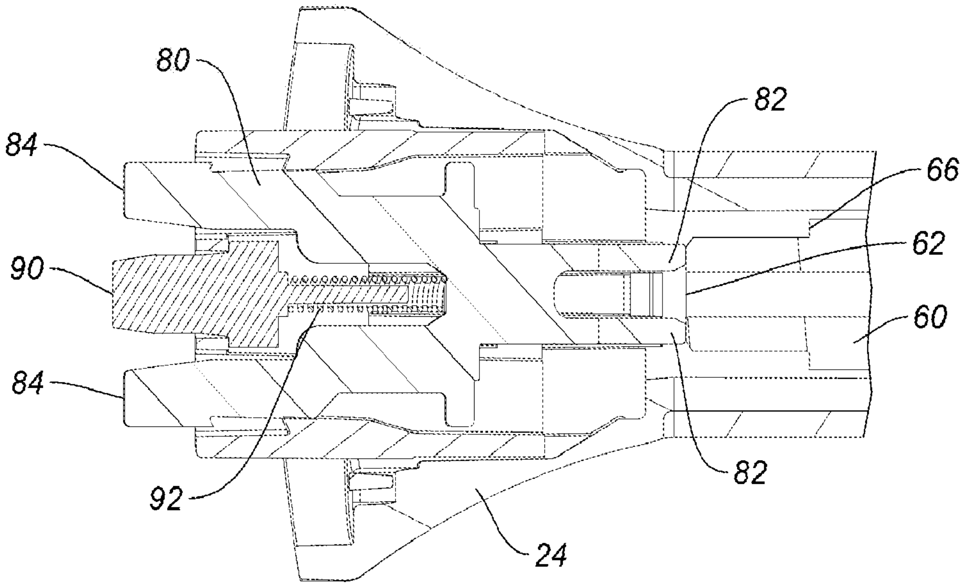
FIG. 9 is a detailed sectional view transverse to FIG. 7.

Referring additionally to FIGS. 7 and 9, detailed sectional views of the cartridge attachment end 24 of the handle 20 are shown. The attachment end 24 is provided with an ejector 80 having an inner end 82 and an outer end 84. The outer end 84 can be bifurcated as shown in FIG. 9, i.e. having two effective outer ends 84. The inner end 82 closely abuts the first end 62 of the transfer rod 60. A plunger 90 is provided to contact a cam surface of the razor cartridge 30 to bias a pivotally supported razor cartridge 30 to an at-rest position and to return the cartridge 30 to its at-rest position when externally applied forces that might pivot the cartridge are removed. A plunger spring 92 acts between the plunger 90 and the root region of the bifurcated outer end(s) 84 to both bias the plunger outwardly of the attachment end 24 of the handle 20 and bias the ejector 80 inwardly of the attachment end 24 to maintain close contact between the inner end 82 of the ejector 80 and the first end 62 of the transfer rod 60. As shown in FIG. 4. An obtuse angle 88, less than 180 degrees is defined between an "extendability" direction 86 of the ejector 80 and the axis 42 of the hollow portion 40. The obtuse angle 88 can provide a preferred angular at-rest position of the razor cartridge 30 relative to the handle 20.

When the pushbutton 50 is moved by a user from its at-rest position to its depressed position it contacts the second end 64 of the transfer rod to move the transfer rod 60 along the axis 42 of the hollow portion 40 in a direction towards the cartridge attachment end 24 against bias forces of the spring 70 such that the first end 62 of the transfer rod 60 contacts the inner end 82 of the ejector 80 to extend the outer end(s) 84 of the ejector 80 outwardly from the cartridge attachment end 24 of the handle 20. The outer end(s) 84 of the ejector 80 contact the razor cartridge 30 (e.g. an inner surface of the connector 34) to eject the cartridge 30 from the handle 20. In doing so, the spring 70 is further compressed to a second condition. When the user releases the pushbutton 50, bias forces of the compression spring 70 act on the transfer rod 60 to bias this towards the opposed end 26 of the handle 20. The transfer rod 60 in turn acts on the pushbutton 50 to return this to its at-rest position. The plunger spring 92 acts on the root region of the bifurcated outer end(s) 84 of the ejector 80 to bias the ejector 80 inwardly of the attachment end 24 to maintain close contact between the inner end 82 of the ejector 80 and the first end 62 of the transfer rod 60.

The second end 64 of the transfer rod 60 abuts but is not securely coupled to the pushbutton 50. In instances of impact forces acting along the length of the handle 20, the transfer rod 60 can move independently of (away from) the pushbutton 50 against forces of the compression spring 70. This can act to absorb impact energy e.g. from accidentally dropping the handle 20 or complete razor 10 onto a hard surface. The second end 64 of the transfer rod 60 can less desirably be securely coupled to the pushbutton 50, e.g. by a suitable adhesive.

The transfer rod 60 provides multiple benefits. It can add mass to the razor handle. It transfers motion from the pushbutton to the cartridge ejector and can provide impact energy absorption.

While various embodiments have been described above it should be understood that they have been presented by way of example only, and not limitation. For instance, modifications or changes as can be made within the scope of the attached claims and features disclosed in connection with any one embodiment can be used alone or in combination with each feature of the respective other embodiments. Thus, the breadth and scope of any embodiment should not be limited by any of the above described exemplary embodiments but should be defined only in accordance with the following claims and their equivalents.

What is claimed is:

1. A handle for a safety razor, comprising:

a body, the body having a cartridge attachment end region, the body further having an elongated portion adjoined to the cartridge attachment end region, the elongated portion having a hollow portion extending within the cartridge attachment end region and the elongated portion, the body defining an axis and the body terminating in an opening normal to the axis at an opposed end of the body, the opposed end of the body opposing the cartridge attachment end region of the body;

a pushbutton slidably retained in the opening and movable along the axis between an at-rest position and a depressed position;

an elongated transfer rod located in the hollow portion, the elongated transfer rod having a first end in a region of the cartridge attachment end region of the hollow portion and a second end abutting the pushbutton but not securely coupled to the pushbutton;

a compression spring located in the hollow portion and acting between the cartridge attachment end region and the first end of the transfer rod to bias the transfer rod in a direction along the axis towards the opening, the compression spring contacting the first end of the transfer rod; and an ejector mounted in the cartridge attachment end region having an outer end being extendable outwardly from the cartridge attachment end region and having an inner end abutting the first end of the transfer rod;

wherein, when the pushbutton is moved from the at-rest position to the depressed position the pushbutton contacts the second end of the transfer rod to move the transfer rod along the axis in a direction towards the cartridge attachment end region against bias forces of the spring such that the first end of the transfer rod contacts the inner end of the ejector to extend the outer end of the ejector outwardly from the cartridge attachment end region of the handle.

2. The handle of claim 1, wherein the transfer rod is tubular.

3. The handle of claim 1, wherein the transfer rod is cylindrical.

4. The handle of claim 1, wherein the transfer rod comprises one of steel, stainless steel, brass, copper alloy, zinc alloy, aluminum alloy, filled thermoplastic polymer and unfilled thermoplastic polymer.

5. The handle of claim 1, wherein the outer end of the ejector is bifurcated.

6. The handle of claim 1, wherein the pushbutton is coupled to the second end of the transfer rod.

7. The handle of claim 1 having an obtuse angle less than 180 degrees between the hollow portion axis and an extendability direction of the ejector.

8. The handle of claim 1, wherein the pushbutton is retained in the hollow portion opening by a snap fit.

9. The handle of claim 1, wherein the entire pushbutton in the depressed position is sub-flush of the opening.

10. A safety razor, comprising:

a handle having a body, the body having a cartridge attachment end region with an adjoined elongated portion having a hollow portion extending within the cartridge attachment end region and the elongated portion, and the body defining an axis terminating in an opening normal to the axis at an opposed end of the body, the opposed end of the body opposing the cartridge attachment end region of the body;

a pushbutton slidably retained in the opening and movable along the axis between an at-rest position and a depressed position;

an elongated transfer rod located in the hollow portion of the handle, the elongated transfer rod having a first end in a region of the cartridge attachment end region of the hollow portion and a second end abutting the pushbutton but is not being securely coupled to the pushbutton;

a compression spring located in the hollow portion and acting between the cartridge attachment end region and the first end of the transfer rod to bias the transfer rod in a direction along the axis towards the opening, the compression spring contacting the first end of the transfer rod; and an ejector mounted in the cartridge attachment end region having an outer end being extendable outwardly from the cartridge attachment end region and having an inner end abutting the first end of the transfer rod;

wherein, when the pushbutton is moved from the pushbutton's at-rest position to the pushbutton's depressed position the pushbutton contacts the second end of the transfer rod to move the transfer rod along the hollow portion axis in a direction towards the cartridge attachment end region against bias forces of the spring such that the first end of the transfer rod contacts the inner end of the ejector to extend the outer end of the ejector outwardly from the cartridge attachment end region of the handle; and a razor cartridge mounted to the cartridge attachment end region of the handle.

11. The safety razor of claim 10, wherein, when the ejector is extended outwardly from the cartridge attachment end region of the handle it contacts the razor cartridge to eject the razor cartridge from the handle.

12. The handle of claim 1, wherein the transfer rod is hollow.

13. The handle of claim 1, wherein the transfer rod has a transfer rod length;

wherein the compression spring has a compression spring length when the compression spring is in the at-rest position;

wherein the compression spring length is less than the transfer rod length.

14. The handle of claim 1, wherein the handle has a handle length;

wherein the transfer rod has a transfer rod length;

wherein the transfer rod length is less than the handle length.

15. The handle of claim 1, wherein the transfer rod has a maximum outer diameter;

wherein the compression spring has a compression spring outer diameter;

wherein the compression spring outer diameter is generally equal to the transfer rod maximum outer diameter.

16. The safety razor of claim 10, wherein the cartridge when mounted to the cartridge attachment region of the handle is generally aligned with the axis.

17. The safety razor of claim 16, wherein the cartridge and the handle are coaxial about the axis.

18. The safety razor of claim 10, wherein the transfer rod is hollow.

19. The safety razor of claim 10, wherein the transfer rod has a transfer rod length;

wherein the compression spring has a compression spring length when the compression spring is in the at-rest position;

wherein the compression spring length is less than the transfer rod length.

20. The safety razor of claim 10, wherein the transfer rod has a maximum outer diameter;

wherein the compression spring has a compression spring outer diameter;

wherein the compression spring outer diameter is generally equal to the transfer rod maximum outer diameter.

* * * * *